United States Patent
Shapira et al.

(10) Patent No.: US 10,175,359 B2
(45) Date of Patent: Jan. 8, 2019

(54) ATMOSPHERIC TURBULENCE DATA OPTICAL SYSTEM

(71) Applicant: SOREQ NUCLEAR RESEARCH CENTER, Yavne (IL)

(72) Inventors: Joseph Shapira, Ashdod (IL); Avraham Englander, Rehovot (IL); Omer Porat, Rehovot (IL)

(73) Assignee: Soreq Nuclear Research Center, Nahal Soreq, Yavne (IL)

(*) Notice: Subject to any disclaimer, the term of this patent is extended or adjusted under 35 U.S.C. 154(b) by 314 days.

(21) Appl. No.: 15/118,189

(22) PCT Filed: Oct. 2, 2014

(86) PCT No.: PCT/US2014/058744
§ 371 (c)(1),
(2) Date: Aug. 11, 2016

(87) PCT Pub. No.: WO2015/054014
PCT Pub. Date: Apr. 16, 2015

(65) Prior Publication Data
US 2017/0168161 A1   Jun. 15, 2017

Related U.S. Application Data

(60) Provisional application No. 61/888,058, filed on Oct. 8, 2013.

(51) Int. Cl.
*G01C 3/08* (2006.01)
*G01S 17/58* (2006.01)
(Continued)

(52) U.S. Cl.
CPC ............. *G01S 17/58* (2013.01); *G01P 5/26* (2013.01); *G01S 17/95* (2013.01); *G06F 17/3064* (2013.01); *Y02A 90/19* (2018.01)

(58) Field of Classification Search
CPC combination set(s) only.
See application file for complete search history.

(56) References Cited

U.S. PATENT DOCUMENTS 7,685,873 B2   3/2010   Shapira
2006/0262324 A1   11/2006   Hays
(Continued)

OTHER PUBLICATIONS

PCT Written Opinion PCT/US2014/058744, dated Feb. 17, 2015.
(Continued)

*Primary Examiner* — Samantha K Abraham
(74) *Attorney, Agent, or Firm* — Dekel Patent Ltd.; David Klein

(57) ABSTRACT

An atmospheric turbulence data optical LIDAR system for computation of wind velocity includes a laser (16) to transmit one or more beams to a target, an optical head (10) including a transmitting optics (12) and a collecting lens (14) for receiving one or more corresponding beam returns from the target. A detection system (18) includes a multi-element detector array at near a focal plane of the collecting lens. For each element of the multi-element detector array there is a specific optical path in the atmosphere leading from the laser to the target and back from the target to the element. A processor measures (20) signal fluctuations of an element of the multi-element detector array and computes therefrom crosswind velocity of wind in the atmosphere. The processor calculates turbulence strength changes.

6 Claims, 2 Drawing Sheets

(51) Int. Cl.
  *G06F 17/30*  (2006.01)
  *G01P 5/26*  (2006.01)
  *G01S 17/95*  (2006.01)

(56) References Cited

U.S. PATENT DOCUMENTS

| | | | |
|---|---|---|---|
| 2010/0253932 A1 | 10/2010 | Shapira | |
| 2011/0219869 A1* | 9/2011 | Asahara | G01P 5/26 |
| | | | 73/181 |
| 2013/0314694 A1* | 11/2013 | Tchoryk, Jr. | G01S 17/95 |
| | | | 356/28.5 |

OTHER PUBLICATIONS

Field test of a lidar wind profiler, Gerard Kunz, Opt. Eng. 35(11), 3074-3083 (Nov. 1, 1996).
Bistatic LIDAR: A Tool for Characterizing Atmospheric Particulates: Part I—The Remote Sensing Problem John A. Reagan ; Department of Electrical Engineering, University of Arizona, Tuscon, AZ 85721 IEEE Transactions on Geoscience and Remote Sensing (vol. GE-20 , Issue: 3 )pp. 229-235.

\* cited by examiner

ATMOSPHERIC TURBULENCE DATA OPTICAL SYSTEM

FIELD OF THE INVENTION

The present invention is related to an atmospheric turbulence data optical system for computation of wind velocity.

BACKGROUND OF THE INVENTION

An aircraft flying through the atmosphere is continually subject to wind effects. It is well known to utilize wind effects to measure aircraft speed, such as the well-known Pitot tube. The Pitot tube is mounted on the aircraft body to measure the total pressure and static pressure of the air. The airspeed is calculated from the impact pressure, which is the difference between the total pressure and static pressure of the air. However, the Pitot tube has disadvantages. They need a costly calibration procedure to each airframe. They protrude from the aircraft body, which is undesirable in some situations, particularly for the military. Air flow measured by the Pitot tube is in the direction of travel alone and does not take into account three-dimensional wind turbulence.

Systems are known for obtaining wind speed information in front of an aircraft and the airspeed of the aircraft by using a LIDAR (laser imaging and detection and ranging) anemometer mounted on the aircraft.

SUMMARY OF THE INVENTION

The present invention seeks to provide a system and method for wind velocity calculation that is more accurate than any other prior art system. The invention is applicable over a wide range of turbulence strength changes and all wind fluctuations. As is explained more in detail below, the invention uses Direct Detection LIDAR to measure wind profile, for both short and long range applications, by looking at laser backscatter from aerosols (or droplets and particles suspended in the air, or air molecules).

There is thus provided in accordance with an embodiment of the present invention an atmospheric turbulence data optical system for computation of wind velocity including a laser adapted to transmit one or more beams to a target, an optical head including a transmitting optics and a collecting lens for receiving one or more corresponding beam returns from the target, a detection system including a multi-element detector array at near a focal plane of the collecting lens, wherein for each element of the multi-element detector array there is a specific optical path in the atmosphere leading from the laser to the target and back from the target to the element, and processor apparatus operative to measure signal fluctuations of an element of the multi-element detector array, and compute therefrom crosswind velocity of wind in the atmosphere, wherein the processor apparatus is operative to calculate turbulence strength changes.

In accordance with an embodiment of the present invention the processor apparatus is operative to compare signal fluctuations patterns of two or more elements of the multi-element detector array, compute variances of image centroid displacements, and use the variances to determine a turbulence strength value and wind in the atmosphere.

In accordance with an embodiment of the present invention the processor apparatus is operative to choose the characteristic spatial frequency for a given turbulence strength for which the wind velocity is inversely proportional.

In accordance with an embodiment of the present invention the processor apparatus is operative to compare signal fluctuations patterns of two or more elements of the multi-element detector array, compute a cross-correlation function, and use the cross-correlation function to define a wind velocity and wind direction in the atmosphere.

In accordance with an embodiment of the present invention a field of view of each element of the multi-element detector array is reduced to 1/n of the laser beam divergence, wherein n is the number of elements in the multi-element detector array.

In accordance with an embodiment of the present invention the beam is transmitted to a target composed of atmospheric aerosols or particles or molecules or a moving target, and wherein the processor apparatus is operative to subtract signals reflected from various distances along the beam path.

In accordance with an embodiment of the present invention the atmosphere turbulence data optical system is adapted to be installed in an aircraft and a light backscattered by atmosphere is generated within remote from the aircraft overlap region of the far-field of the collecting lens corresponding to the transmitted beam.

In accordance with an embodiment of the present invention the data processor provides for computing the true aircraft speed and the sideslip or the angle of attack if the atmosphere turbulence data optical system composed of single LIDAR system.

In accordance with an embodiment of the present invention the data processor provides for computing the true aircraft speed, the sideslip and the angle of attack if the atmosphere turbulence data optical system composed of two LIDAR systems with different line-of-sight paths (at an angle to each other) seeks to provide a 3-axis wind vector.

In accordance with an embodiment of the present invention the data processor provides for computing the true aircraft speed, the sideslip, the angle of attack, the rolling and the vertical aircraft speed if the atmosphere turbulence data optical system composed of three LIDAR systems with different line-of-sight paths (at an angle to each other).

BRIEF DESCRIPTION OF THE DRAWINGS

The present invention will be understood and appreciated more fully from the following detailed description taken in conjunction with the drawing in which.

DETAILED DESCRIPTION OF EMBODIMENTS

Figure 1:
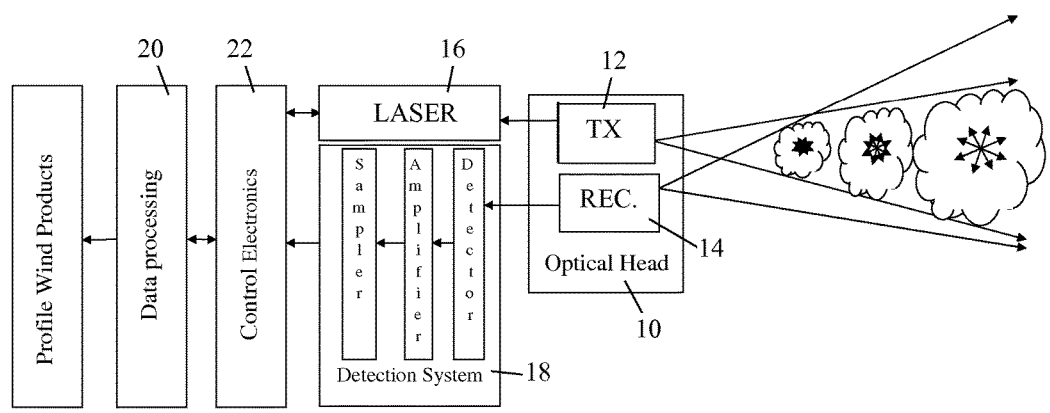
FIG. 1 is a simplified schematic illustration of a system for aircraft velocity calculation (atmospheric turbulence data optical system), constructed and operative in accordance with an embodiment of the present invention.

Reference is now made to FIG. 1, which illustrates a system for aircraft velocity calculation, constructed and operative in accordance with an embodiment of the present invention.

The system uses Direct Detection LIDAR to measure wind profile, for both short and long range applications, by looking at laser backscatter from aerosols (or droplets and particles suspended in the air, or air molecules). This measurement takes advantage of a well experienced method of the beam intensity fluctuations temporal statistics analysis. The fluctuations are produced when refractive-index irregularities in the atmosphere are drifted across the beam (See R. S. Lawrence et al, in Applied Optics, Vol. 11 (1972), No. 2, pp. 239-243 and Ting-I Wang et al, in Applied Optics, Vol. 20 (1981), No. 23, pp. 4073-4081). By measuring a time-lagged covariance function with spaced detectors and by computing a temporal spectrum of the fluctuations, one can determine the speed and direction of the crosswind. However, prior art methods allow measurement of some "average", integral cross-wind.

The present invention seeks to provide a system that measures directly 3-axis wind speed profile, using backscattering from aerosol in according to a method suggested by J. Shapira in U.S. Pat. No. 7,685,873 (method for crosswind velocity measurement including using a correlation between the atmosphere turbulence strength and the spatial scale spectrum of turbulence eddies in the atmosphere to calculate wind velocity), which is incorporated in its entirety herein by reference, and supplies this wind profile to an aircraft's flight control system for true aircraft speed, sideslip, rolling and angle of attack computing.

More specifically the method of U.S. Pat. No. 7,685,873 may include the steps of:

a—sending a laser beam toward a desired far object position;

b—taking an image (e.g., movie) of a far object (e.g., laser spot on the object) by a multi-element receiver or by the multi-element receiver receiving the beam reflected by the object;

c—determining the object range by measuring the time lag between the generation of the laser beam and the reception of the reflected beam;

(Methods for range determination, which can be used to carry out this step, are described, e.g., in The Infrared Electro-Optical Systems Handbook, Vol, 6: "Active Electro-Optical Systems", Clinton S. Fox Editor, SPIE Press 1993, USA)

d—computing a normalized time-lagged cross-correlation function (CCF) of signals obtained from different elements of the receiver after filtering the signals by means of a low band pass filter with a variable cut-off frequency;

e—determining a specific cut-off frequency $f_{cut}^s$ of the low band pass filter correspondences to the maximum dissymmetry of the cross-correlation function $\xi_{max}$ and obtaining therefrom a wind direction. The CCF dissymmetry $\xi$ is given by:

$$\xi = \frac{\sum CCF_{pos} - \sum CCF_{neg}}{\sum CCF_{pos} + \sum CCF_{neg}},$$

wherein $\Sigma CCF_{pos}$ and $\Sigma CCF_{neg}$ are the cumulative values in the positive and negative parts of the CCF accordingly. The sign of the $\xi_{max}$ gives the crosswind direction.

f—computing a variance $\sigma_c^2$ of the image centroid displacements and calculating therefrom the atmosphere turbulence strength $C_n^2$.

For double-pass distance L the turbulence strength $C_n^2$ is given by:

$C_n^2 = 0.34\sigma_c^2 L^{-1} D^{1/3}$, here D is a diameter of the receiver optics.

g—determining an effective spatial scale of refractive irradiance fluctuations that is given (e.g., according to L. C. Andrews et al.) by a coherence radius $\rho_0$ for weak turbulence state or by $L/k\rho_0$ for strong turbulence state, both values are calculated using the earlier obtained turbulence strength $C_n^2$, the double-pass distance L and the known wave number k (e.g., for plane wave $\rho_0 = (1.46 C_n^2 k^2 L)^{-3/5}$). The specific area of the object can be chosen for cross-wind velocity calculation by adjusting a field of view of the receiver (e.g., by choosing a proper number of the receiver elements) in accordance with the determined spatial scale, that noted with the long "life time".

h—computing the specific frequency $f_c$ of the cumulative signal received from the earlier chosen part of the object after filtering the aforementioned signal by mean the low band pass filter with specific cut-off frequency $f_{cut}^s$. The specific frequency $f_c$ can be obtained, e.g., by computing the number of zero crossing points (number of times the momentary signal cross the average signal).

i—obtaining path-averaged crosswind velocity which is proportional to the specific frequency $f_c$. Specific frequency $f_c$ is characterized by the number of eddies, which size corresponds to the determined spatial scale that crossed the field of view of the receiver in a time unit. A value of the proportional coefficient depends on the distance to the object and the turbulence strength $C_n^2$ and is determined after using a proper calibration.

The present invention seeks to provide an atmospheric turbulence data optical system (ATOS). Some advantages of the ATOS system include the following:

a. Airframe independent
b. Does not need calibration
c. Low discoverability
d. Ability to detect wake vortex, wind shear and clear air turbulence Referring to FIG. 1, the system includes an optical head 10 with a transmitter (e.g., optical transmitter) 12 and receiver (e.g., optical receiver) 14, laser 16, detection system 18 and a processor (data processing unit) 20 with control electronics 22. FIG. 1 illustrates how transmitted laser light, which has been scattered by the atmosphere, is gathered by receiver 14 and processed by detection system 18.

In accordance with an embodiment of the present invention, the detection system 18 is a multi-element detector array. A field of view of each element of the multi-element detector array is reduced to 1/n of the laser beam divergence, wherein n is the number of elements in the multi-element detector array 18.

The high-energy and high repetition rate pulsed laser is aligned with the optical transmitter 12. The laser beam propagates through the atmosphere and is scattered by atmospheric aerosol. The turbulent atmosphere can be considered as composed of discrete blobs or eddies, each of which has a different refractive index than its neighbors due to temperature inhomogeneity of the atmosphere. The interaction of the laser beam with the turbulent medium leads to random amplitude and phase variations, resulting in fluctuations in the intensity distribution of the laser beam. The backscattering from aerosol, influenced by the turbulence atmosphere, is registered by the detector matrix (array) of detection system 18, and the system measures the intensity fluctuations on each detector. The cross-wind leads to the drift of the scintillation pattern across the line-of-sight path. By choosing two spaced detectors of the matrix, the cross-wind is obtained along the horizontal or vertical direction, by analyzing the cross-correlation function as explained in U.S. Pat. No. 7,685,873. Using very high sampling rate digitizer, signals are detected from different distances and the cross-wind profile is obtained along the line-of-sight path, as explained in U.S. Pat. No. 7,685,873. A more complex system includes two LIDAR's with different line-of-sight paths (at an angle to each other) that provides a 3-axis wind vector for computing the true aircraft speed, the sideslip and the angle of attack. An even more complex system includes three LIDAR's with different line-of-sight paths (at an angle to each other) that provides data for computing roll angle (see FIG. 2).

Two different configurations for the LIDAR system are possible. In a bi-static configuration, there is parallax between the transmitter and the receiver, and the fields of view of the detector row and the laser beam cross each other. In the bi-static configuration, the scattering is preferably only detected in the interaction region and there is no return from a near-field region. The far-field region is not influenced by the aircraft's wake. In a mono-static configuration, the line-of-sight path axes of transmitter and receiver coincide, and wind profiling can be performed by time-delayed high speed sampling of the signals from different distances. To realize high wind profile resolution, one can use a high-sampling-rate digitizer with n simultaneously sampled channels. The time between samplings and the laser pulse length defines the possible space resolution limit.

Figure 2:
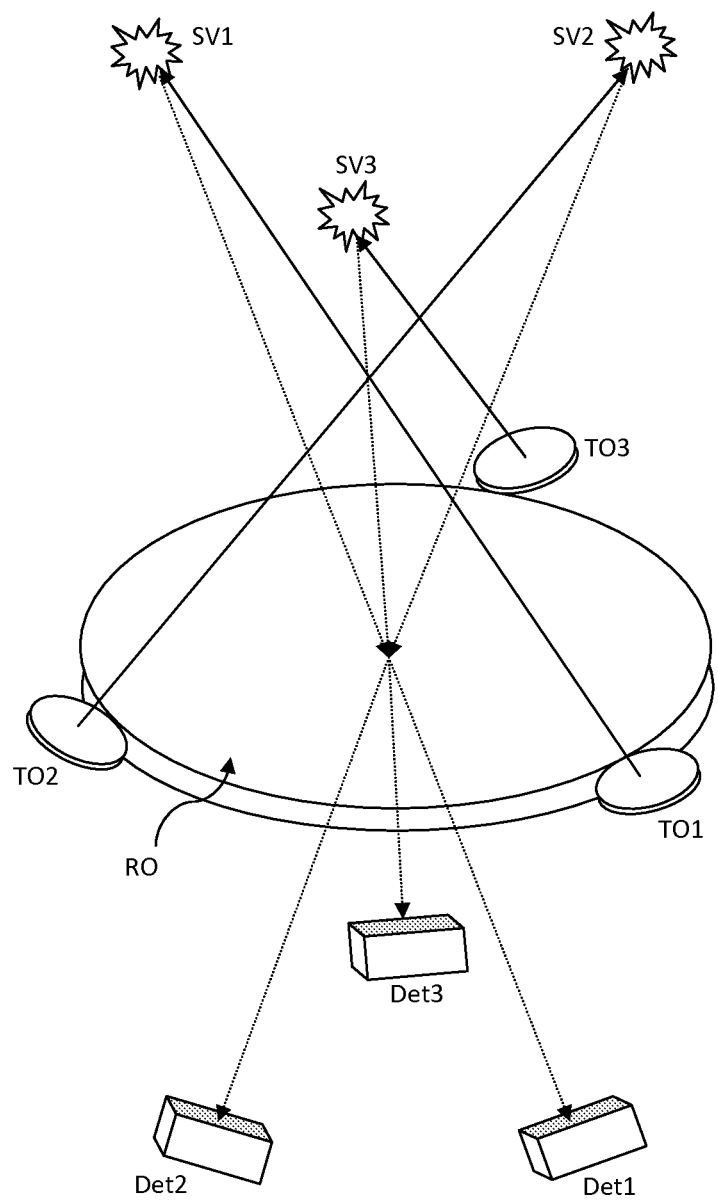
FIG. 2 is a simplified schematic illustration of an optical head of the atmospheric turbulence data optical system, constructed and operative in accordance with an embodiment of the invention.

FIG. 2 illustrates an optical head of the ATOS, constructed and operative in accordance with an embodiment of the invention. The optical head includes three LIDAR's with different line-of-sight paths (at an angle to each other). Each LIDAR is composed of transmitting optics TO, scattering volume SO and optical detector matrix DET at near a focal surface of a receiver, e.g., a collecting lens. The collecting lens RO may be common for each LIDAR. The geometry provides true aircraft speed, a sideslip, an angle of attack, a rolling and a vertical aircraft speed.

What is claimed is:

1. An atmospheric turbulence data optical LIDAR system for computation of wind velocity comprising:
   two LIDAR systems with different line-of-sight paths at an angle to each other, each of said LIDAR systems comprising:
   a laser adapted to transmit one or more beams to a target;
   an optical head comprising an optical transmitter and an optical receiver for receiving one or more corresponding beam returns from the target;
   a detection system comprising a multi-element detector array at near a focal plane of the optical receiver, wherein for each element of the multi-element detector array there is a specific optical path in the atmosphere leading from the laser to the target and back from the target to the element;
   wherein a field of view of each element of the multi-element detector array is reduced to 1/n of the laser beam divergence, wherein n is the number of elements in the multi-element detector array; and
   a processor operative to measure signal fluctuations of an element of the multi-element detector array and compute therefrom crosswind velocity of wind in the atmosphere, wherein the processor is operative to calculate turbulence strength changes;
   wherein line-of-sight path axes of said transmitters and said receivers coincide; and
   wherein said processor is operative to perform wind profiling by time-delayed high speed sampling of signals from different distances detected by said detection system, said processor using a sampling-rate digitizer with n simultaneously sampled channels corresponding to said number of elements in said multi-element, detector array.

2. The system according to claim 1, wherein a time between samplings of said sampled channels and a pulse length of said laser define a space resolution limit.

3. A method for computation of wind velocity comprising using the system of claim 1 to compute crosswind velocity of wind in the atmosphere.

4. The method according to claim 3, wherein the laser beam propagates through a turbulent atmosphere and is scattered by atmospheric aerosol, and wherein the turbulent atmosphere is composed of discrete blobs or eddies, each of which has a different refractive index than its neighbors due to temperature inhomogeneity of the atmosphere, and wherein an interaction of the laser beam with the turbulent atmosphere leads to random amplitude and phase variations, resulting in fluctuations in the intensity distribution of the laser beam, and wherein backscattering from aerosol, influenced by the turbulent atmosphere, is registered by the multi-element detector array, and further comprising measuring intensity fluctuations on each element of the multi-element detector.

5. The method according to claim 3, further comprising providing a 3-axis wind vector for computing true aircraft speed, sideslip and angle of attack.

6. The method according to claim 1, comprising three LIDAR systems with different line-of-sight paths at an angle to each other, wherein the method includes computing true aircraft speed, sideslip and angle of attack, a rolling and a vertical aircraft speed.

* * * * *